United States Patent [19]

Hampton et al.

[11] Patent Number: 5,564,558
[45] Date of Patent: Oct. 15, 1996

[54] HIGH TEMPERATURE CONVEYOR ASSEMBLY

[75] Inventors: John Hampton; A. Ronald Hetrich, both of Manheim; David Obetz, Lititz, all of Pa.

[73] Assignee: Fenner, Inc., Manheim, Pa.

[21] Appl. No.: 354,553

[22] Filed: Dec. 13, 1994

[51] Int. Cl.$^6$ .................................................. B65G 17/12
[52] U.S. Cl. ....................................................... 198/850
[58] Field of Search ................................. 198/850, 844.1; 474/241; 414/157, 196

[56] References Cited

U.S. PATENT DOCUMENTS

| | | | |
|---|---|---|---|
| 72,181 | 12/1867 | Fountain, Jr. | 474/237 |
| 1,177,664 | 4/1916 | Vuilleumier | 474/249 |
| 1,182,933 | 5/1916 | Schulte | 474/241 |
| 1,438,566 | 12/1922 | Wiggins | 198/844.1 X |
| 1,519,165 | 12/1924 | Pilliner | 474/241 |
| 3,154,961 | 11/1964 | Creswell | 474/241 |
| 3,345,113 | 10/1967 | Siber | 198/847 X |
| 3,387,500 | 6/1968 | Hutzenlaub et al. | 474/260 |
| 3,418,862 | 12/1968 | Hurbis | 474/241 X |
| 3,991,632 | 11/1976 | Stephens | 474/241 |
| 4,015,038 | 3/1977 | Romanski et al. | 474/260 X |
| 4,028,956 | 6/1977 | Thompson | 474/241 |
| 4,055,265 | 10/1977 | Eiserman | 198/844.1 X |
| 4,377,365 | 3/1983 | Layh | 198/844.1 X |
| 4,903,824 | 2/1990 | Takahashi | 198/853 |
| 5,011,003 | 4/1991 | Gladding | 198/844.1 |

FOREIGN PATENT DOCUMENTS 59-97345   6/1984   Japan.

Primary Examiner—David A. Bucci
Attorney, Agent, or Firm—Dann, Dorfman, Herrell and Skillman; Henry H. Skillman

[57] ABSTRACT

A conveyor belt comprising a series of belt links arranged in superimposed successive overlapping relation secured together by interlocking belt link fasteners and apertures, combined with heat protection barriers to protect the belt from contacting high temperature materials that are transported. The barriers interlock with the links of the belt forming a surface which contacts the high temperature materials.

15 Claims, 8 Drawing Sheets

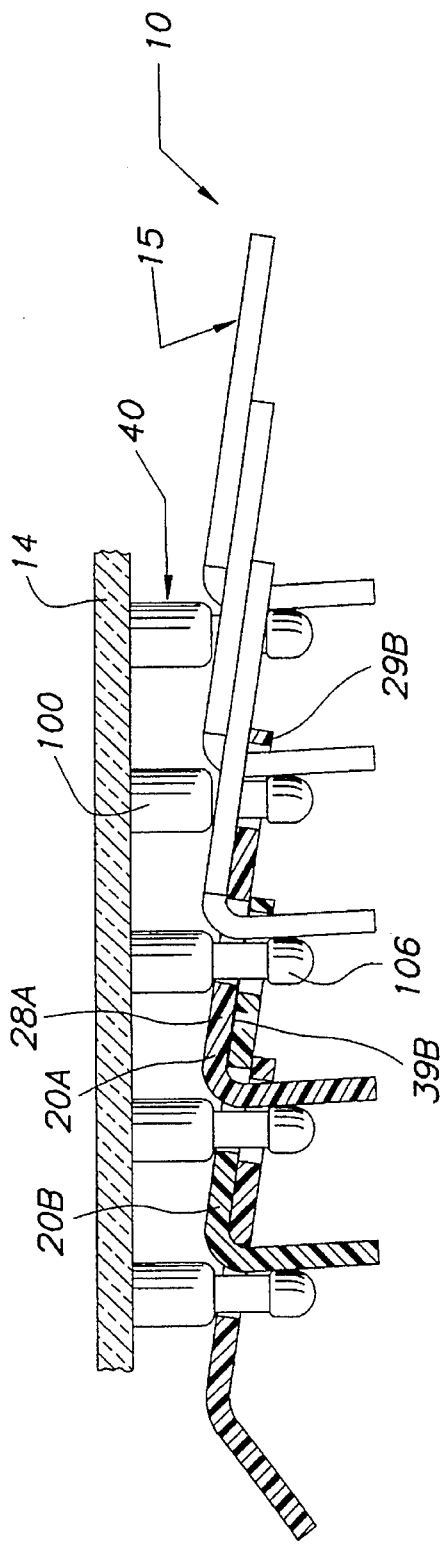
FIG. 11
FIG. 13
FIG. 12

HIGH TEMPERATURE CONVEYOR ASSEMBLY

FIELD OF THE INVENTION

The present invention relates to interlocking-link conveyor belts and has particular application for belts that must convey parts at elevated temperatures.

BACKGROUND OF THE INVENTION AND DISCUSSION OF PRIOR ART

Link belts are generally known and used in a variety of applications, such as transmission belts and conveyor belts. When used as a conveyor, link belts frequently must transport materials that have been heated to elevated temperatures. When the temperature of the materials conveyed exceeds 300° F. conventional link belts degrade and fail prematurely.

To overcome the difficulties associated with extreme high temperatures, it has been proposed to make the belt links out of a ceramic material, such as the belt disclosed in Takahashi 4,903,824. The problem with these belts is they are expensive to make, typically requiring an entirely new manufacturing process to fabricate the belt.

Another way to overcome the difficulties associated with high temperatures is proposed in Japanese Patent No. 0.097, 345. The '345 patent proposed to overcome the problem by utilizing a series of narrow C-shaped members to encase the belt on three sides. This solution suffers from several problems.

First, the heat protection members must be sufficiently short so that they do not affect the flexibility of the belt. Significantly increasing the rigidity of the belt will hinder the ability of the belt to properly flex around the pulleys that drive the belt. If the heat protection members are short enough to maintain the flexibility of the belt, then the number of members required to protect a belt is quite high, making it time consuming to connect all of the members to the belt.

The second problem associated with the proposal in the '345 patent is that it interferes with the mechanism used to drive the belt. By enclosing the belt on three sides, the heat protection members increase the width of the belt and affect the shape of the belt. This creates difficulties with the interface between the belt and the mechanism driving the belt.

SUMMARY OF THE INVENTION

The present invention provides a high temperature conveyor assembly comprising an interlocking-link belt and a heat protection barrier. It allows standard link belts to be used in high temperature applications. The standard link belt is designed with sufficient tensile strength to convey the weight of the material being transported. This allows the material composing the heat protection barriers to be selected without significant regard to the tensile strength of the material.

In accordance with this invention, an interlocking link belt is formed by connecting a series of belt links together so that each belt link connects with and overlaps at least one preceding belt link. A heat protection barrier is connected to this belt to provide a barrier preventing the belt from contacting hot workpieces being conveyed by the assembly.

The invention provides for a belt comprised of individual links. Each belt link has a body portion and a fastener. At least one aperture extends through each body portion. The belt links are connected by passing the fastener through the aperture in at least one preceding belt link.

The invention also provides for a heat protection barrier that prevent hot material from coming into contact with the surface of the link belt. More specifically, the invention provides for a heat protection barrier comprised of individual barrier links or barrier spacers that interlock with the individual links of the belt. The barriers either extend through the apertures in the belt links or they attach to the fastener on the belt links.

In most embodiments of the present invention, the barrier links and barrier spacers connects to the belt links by passing the barrier connector through the aperture of at least one belt link. However, the invention also provides for a heat protection barrier with a socket that connects to the fastener on the belt links.

BRIEF DESCRIPTION OF THE DRAWINGS

FIG. 11 is a fragmentary side view partially in section, of a further embodiment of a high temperature interlocking-link conveyor assembly having a heat protection barrier comprising a number of cylindrical barrier spacers.

FIG. 12 is a side view of an individual cylindrical barrier spacer as shown in FIG. 11.

FIG. 13 is a top view of an individual cylindrical barrier spacer as shown in FIG. 12.

DETAILED DESCRIPTION OF THE PREFERRED EMBODIMENTS

Figure 1:
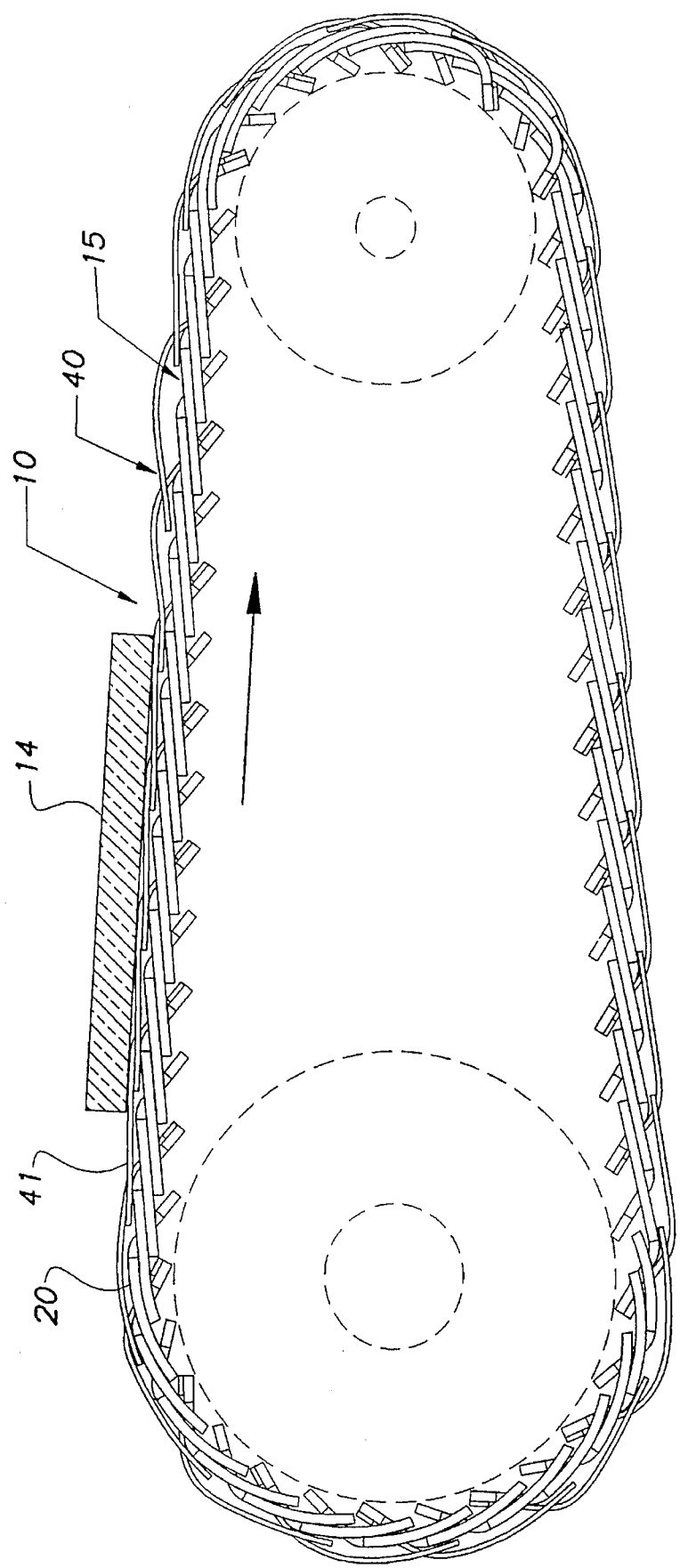
FIG. 1 is a side view of a high temperature interlocking-link conveyor assembly having a heat protection barrier with interlocking barrier links manifesting the present invention, shown transporting material and engaged by a driving mechanism for the assembly.

Referring now to the drawings in general and FIG. 1 specifically, the preferred embodiment of a high temperature conveyor assembly comprising an interlocking-link belt 15 and a heat protection barrier 40 is designated generally 10. The assembly 10 is shown transporting a workpiece 14 that has been heated to an elevated temperature.

The belt 15 comprises a series of interlocking belt links 20. Connected to the belt, the barrier 40 provides a protective layer keeping the belt from coming into contact with the hot workpiece 14. The barrier 40 can comprise a series of barrier links or spacers; however, in the preferred embodiment, the barrier comprises a series of barrier links 41 interconnecting with both the individual belt links 20, and with adjacent barrier links.

Figure 2:
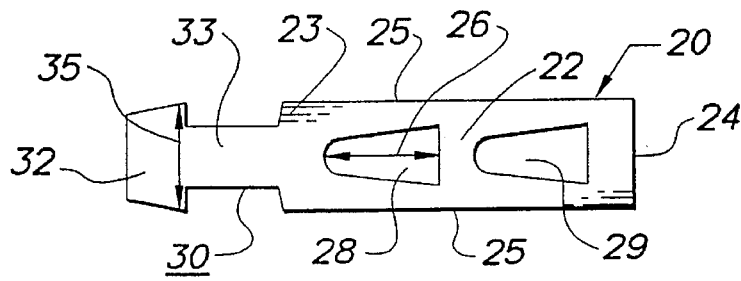
FIG. 2 is a top view of an individual link of the belt shown in FIG. 1 prior to assembly.
Figure 3:
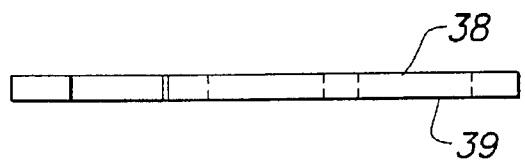
FIG. 3 is a side view of the individual belt link shown in FIG. 2.

One of the individual links that comprise belt 15 is illustrated in FIGS. 2 and 3. Each belt link 20 has a body portion 22 and a fastener 30 connected to the body portion. In the present instance, the thickness of the belt link 20 between the top surface 38 and the bottom surface 39 is substantially uniform throughout the entire link.

The body portion 22 is generally rectangular, having two edges 25 extending longitudinally between a leading end 23 and a trailing end 24, both of which extend transversely between the two edges. Adjacent leading end 23 a leading aperture 28 extends through the thickness of body portion 22. Longitudinally spaced from the leading aperture 28 adjacent the trailing end 24, a trailing aperture 29 extends through the thickness of body portion 22.

The leading end 23 corresponds to the direction in which the assembly 10 travels as shown by the arrow in FIG. 1. However, the direction in which the assembly 10 travels can be reversed so that the leading end 23 does not lead the trailing end 24 with respect to the actual travel of the assembly.

The fastener 30 integrally connects the body portion 22, and comprises a fastening tab 32 and a constricted neck 33. The beck extends longitudinally, with one end connected to the fastening tab 32, and the other end connected to the leading end 23 of body 22. The length of the neck 33 between the leading end 23 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck 35, and tapering as it extends away from the neck.

The belt links 20 are connected by passing the link fasteners through the apertures in adjacent belt links. To ensure that the belt links can properly connect, the apertures must be configured and dimensioned with reference to the fastening tab and the neck.

In the present instance, the apertures through body 22 are non-circular. Both apertures 28 and 29 are longitudinally elongated so that their length 26 is greater than their width.

To ensure that fastening tab 32 can pass through the apertures, the length of the apertures 26 is greater than the greatest width 35 of the fastening tab 32.

The width of apertures 28 and 29 is not constant. Instead, the apertures widen as they extend toward trailing end 24. To provide proper connection between the belt links 20, the apertures are narrower than the fastening tab width 35 so that the fastening tab 32 cannot pass back through the apertures once the belt links are connected. However, the apertures are wider than the neck 33 to allow the neck to extend through the apertures while the belt links are connected, as will be discussed below.

Figure 4:
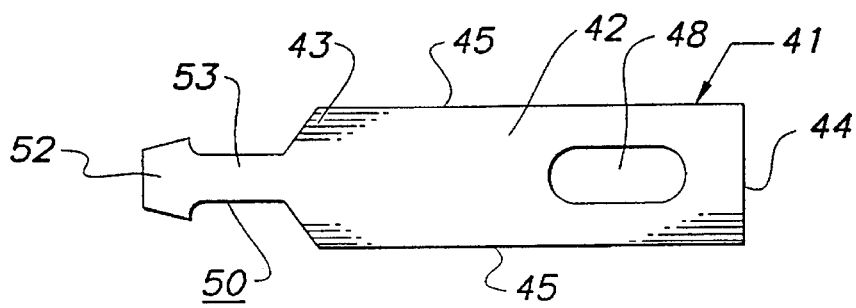
FIG. 4 is a top view of an individual heat protection barrier link of the assembly shown in FIG. 1 prior to assembly.
Figure 5:
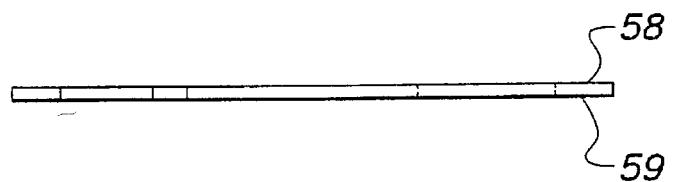
FIG. 5 is a side view of the individual heat protection barrier link shown in FIG. 4.

The preferred embodiment of one of the individual barrier links that comprise the heat protection barrier is illustrated in FIGS. 4 and 5. Each barrier link 41 has a body portion 42 and a connector 50. In the present instance, the thickness of barrier link 41 between the top surface 58 and the bottom surface 59 is of substantially uniform thickness throughout the entire link.

The barrier body portion 42 is generally rectangular, having two longitudinal edges 45 and two transverse ends, namely a leading end 43 and a trailing end 44. Remote from the leading end 43 and longitudinally-aligned with the connector 50, an aperture 48 extends through the thickness of the barrier body 42.

Adjacent the barrier leading end 43, the barrier body 42 tapers longitudinally and integrally connects with the barrier connector 50. The barrier connector 50 comprises a connector tab 52 and a constricted neck 53.

The barrier neck 53 extends longitudinally, with one end connected to the connector tab 52, and the other end connected to the leading end 43 of the barrier body 42. The length of the neck 53 between the leading end of barrier body 43 and the connector tab 52 is sufficiently long to allow the barrier connector to extend through the apertures in two belt links 20 and one barrier link 41 as will be further discussed below.

The connector tab 52 is generally trapezoidally shaped, and in this instance is smaller than the fastening tab 32 of belt link 20. The connector tab 52 is substantially wider than the barrier neck 53, being widest at the point it intersects the barrier neck, and tapering as it extends away from the barrier neck.

In the preferred embodiments, each barrier link 41 is connected to an adjacent barrier link. To ensure that the barrier links can be properly connected, the length and width of the barrier aperture 48 is determined with reference to the barrier connector tab 52 and the barrier neck 53.

In the present instance, the aperture through barrier body 42 is non-circular. The aperture 48 is longitudinally elongated so that the length is greater than the width. Additionally, to ensure that the connector tab 52 can pass though the barrier aperture 48, the length of the aperture is greater than the greatest width of the barrier connector tab 52.

To prevent the connector tab 52 from passing back through the aperture once the barrier links are connected, the width of the barrier aperture 48 is narrower than the width of the connector tab. As will be discussed below, the barrier neck 53 must extend through the barrier aperture 48 while the barrier links are connected. To allow this, the barrier aperture 48 must be wider than the width of the barrier neck 53.

The belt links 20 are made of a material of sufficient tensile strength to convey the weight of the hot workpiece 14. In the preferred embodiment, the belt links 20 are made of a urethane elastomer that is reinforced with a polyester fabric.

Because the belt links have sufficient tensile strength to convey the weight of the hot workpiece 14, the material used to make the barrier links can be selected for its resistance to damage when exposed to elevated temperatures, without significant regard to its tensile strength. In the preferred embodiments, the barrier links 41 are made from polytetrafluoroethylene (PTFE).

The barrier links 41 can either comprise a base material with a layer of heat resistant material on the surface of the barrier link exposed to the hot workpiece 14, or the entire barrier link can be made from a heat resistant material. In the present instance, the entire barrier link 41 is made from the same material, preferably PTFE.

As previously stated, the assembly 10 comprises an interlocking-link belt 15 and a heat protection barrier 40, which are comprised of belt links 20 and barrier links 41 that have been described above. The following discussion describes the interconnections between the belt links 20 and the barrier links 41.

Figure 6:
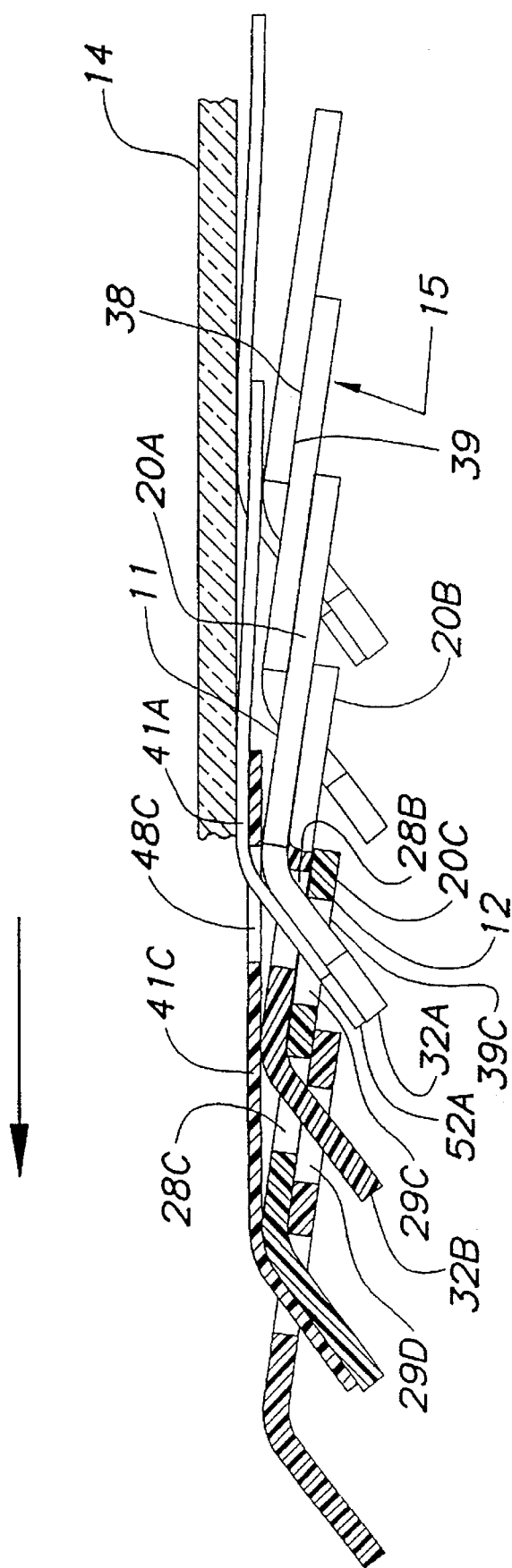
FIG. 6 is a fragmentary side view partially in section, of the assembly shown in FIG. 1.

As shown in FIG. 6, a series of belt links 20 and barrier links 41 are arranged in a superimposed successive overlapping relation to form the belt 15 with a heat protection barrier 40. The bottom surface 39 of each belt link overlaps the top surface 38 of an adjoining belt link, so that the thickness of the belt 15 is at least twice the thickness of an individual belt link 20.

Figure 7:
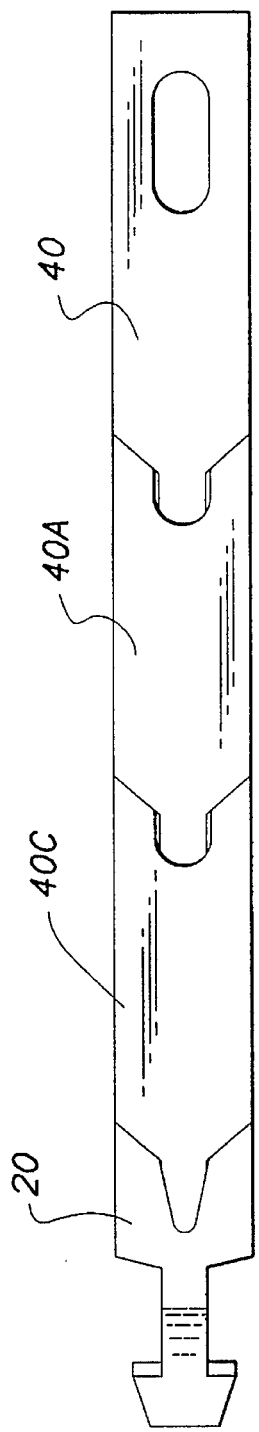
FIG. 7 is a top view of the assembly shown in FIG. 6.

FIGS. 6 and 7 illustrate a portion of the assembly 10, showing how the barrier 40 is connected to the belt 15. Included in these views is the connection between a belt link 20A, and the two preceding belt links, 20B, and 20C. In this connection, the fastening tab 32A of belt link 20A passes sideways through apertures in the two preceding belt links. It first passes through the leading aperture 28B of the adjacent preceding belt link 20B and then passes through the trailing aperture 29C of the next preceding belt link 20C.

The term preceding is used with respect to the direction the assembly travels, as shown in by the arrow in FIG. 6. Because the direction of travel can be reversed, the preceding belt links can be succeeding with respect to the actual travel of the assembly 10.

After passing through the aperture in belt link 20C, the belt link fastening tab 32A is twisted to bear against the bottom surface 39C of belt link 20C. When connected in this way, the top surface of belt link 20A is the top side 11 of belt 15, and the bottom surface 39C of belt link 20C is the bottom side 12 of belt 15.

The barrier links 41 attach to the belt 15 similar to the manner in which the belt links 20 attach to one another. FIGS. 6 and 7 illustrate the connection between two barrier links 41A and 41C, and three belt links, 20A, 20B, and 20C. The connector tab 52A of barrier 41A passes sideways through the aperture of the preceding barrier link and two belt links. It first passes through the aperture 48C of the adjacent preceding barrier link 41C, then though the leading aperture 28B of an adjacent preceding belt link 20B and finally through the trailing aperture 29C of the next preceding belt link 20C.

After passing through the aperture in belt link 20C, the barrier connector tab 52A is twisted to bear against the bottom surface 39C of belt link 20C.

As can be seen in FIG. 6, in the preferred embodiments not every belt link 20 has a barrier link 41 associated with it. Instead, the barriers links 41 are sufficiently long so that each belt link 20 is protected by a barrier link, but a barrier link is only associated with alternating belt links.

For example, belt link 20A has a barrier link 41A associated with it as can be seen by the fact that connector tab 52A and fastening tab 32A pass through apertures 28B and 29C adjacent one another. Belt link 20B does not have a barrier associated with it as can be seen by the fact that fastening tab 32B passes through apertures 28C and 29D without an adjacent barrier connector tab.

Figure 8:
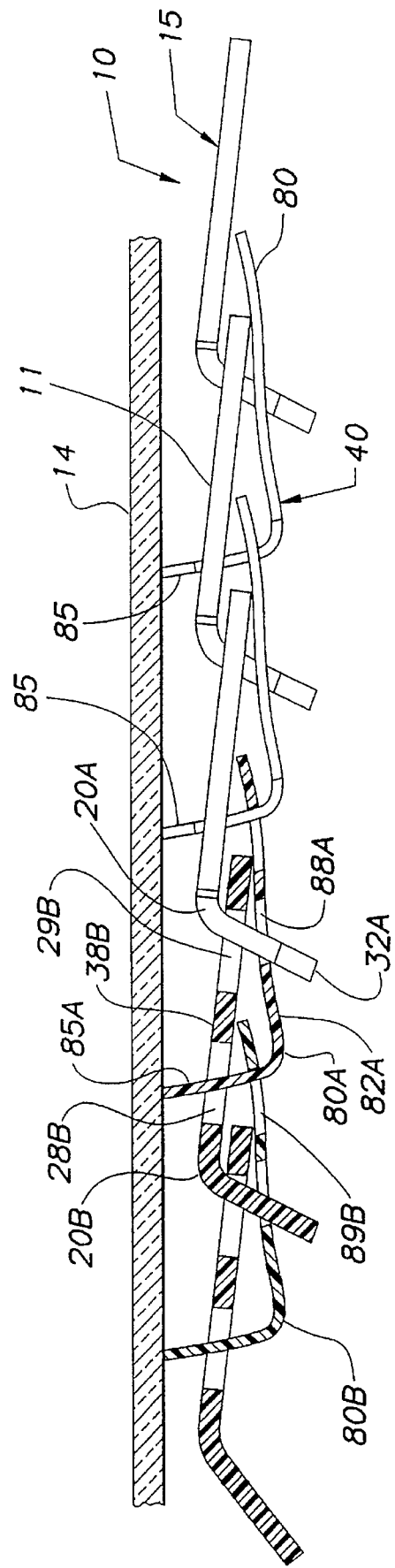
FIG. 8 is a fragmentary side view partially in section, of a second embodiment which comprises a high temperature interlocking-link conveyor assembly having a heat protection barrier in which the barrier links have two apertures.

The separate embodiment illustrated in FIG. 8 illustrates a section of the assembly 10 in which the heat protection barrier 40 comprises barrier links 80 that have two apertures instead of one. Additionally, the belt links in this embodiment are connected in a manner different than the preferred embodiment.

Figure 9:
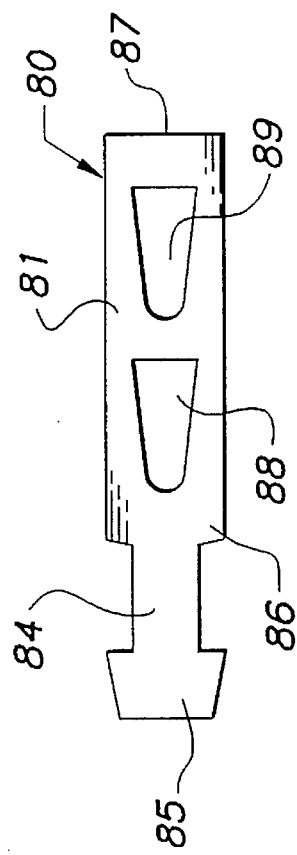
FIG. 9 is a top view of an individual heat protection barrier link as shown in FIG. 8.

In the embodiment illustrated in FIG. 8, barrier links 80 are shaped substantially similar to belt links 20, as can be seen in FIGS. 2 and 9. Additionally, the dimensions of the different portions of barrier links 80 are substantially similar to the corresponding portions of the belt links 20.

In this embodiment, the barrier 40 comprises a series of barrier links 80, each having a barrier body 81 with a leading end 86 and a trailing end 87. Adjacent the leading end 86 is a leading aperture 88 through the barrier body 81. Longitudinally spaced from the leading aperture 88 and adjacent the trailing end 87, is a trailing aperture 89 through the barrier body 81. Adjacent the leading end 86, a barrier neck 84 integrally connects to barrier body 81. The neck 84 extends longitudinally and then integrally connects with the barrier connector tab 85.

FIG. 8 illustrates the connection between two barrier links 80A and 80B, and two belt links 20A and 20B. The belt link 20A is connected to the preceding belt link 20B and an adjacent barrier link 80A. The barrier link 80A is connected to the preceding barrier link 80B and the adjacent belt link 20B.

The fastening tab 32A of belt link 20A passes sideways through the trailing aperture 29B of the preceding belt link 20B, then through the leading aperture 88A of barrier 80A. After passing through the aperture in belt link 20B, the belt fastening tab 32A is twisted to bear against the top surface 82A of barrier link 80A.

The barrier links 80 attach to the belt links 20 in a similar manner. The connector tab 85A of barrier link 80A passes sideways through the trailing aperture 89B of the preceding barrier link 80B, then through the leading aperture 28B of belt link 20B. After passing through the aperture in belt link 80B, the barrier connector tab 85A is twisted to bear against the top surface 38B of belt link 20B.

When connected in this manner, the barrier connector tabs 85 extend beyond the top surface 11 of the belt 15, as illustrated in FIG. 8, so that the hot material 14 rests on the connector tabs 85 instead of the belt 15. Although twice as many barrier links 80 are used in this embodiment as in the preferred embodiment, only half as many belt links 20 are used.

Figures 16, 17:
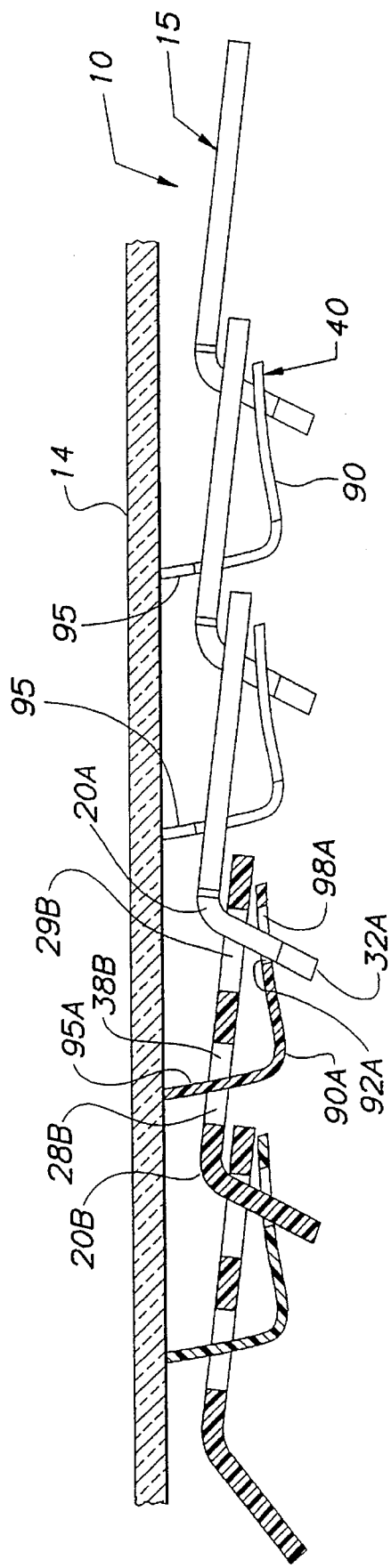
FIG. 16 is a fragmentary side view partially in section, of another embodiment of a high temperature interlocking-link conveyor assembly having a heat protection barrier in which the barrier links have an aperture.
FIG. 17 is a top view of an individual heat protection barrier link as shown in FIG. 16.

The separate embodiment illustrated in FIG. 16 illustrates a section of the assembly 10 in which the heat protection barrier 40 comprises barrier links 90 that have one aperture. Additionally, the belt links in this embodiment are connected in a manner different than the preferred embodiment.

In this embodiment, as shown in FIGS. 16 and 17, the barrier 40 comprises a series of barrier links 90, each having a barrier body 91 with a leading end 96 and a trailing end 97. Adjacent the leading end 96 is an aperture 98 through the barrier body 91. Adjacent the leading end 96, a barrier neck 94 integrally connects to barrier body 91. The neck 94 extends longitudinally and then integrally connects with the barrier connector tab 95.

FIG. 16 illustrates the connection between a barrier link 90A and two belt links 20A and 20B. The belt link 20A is connected to the preceding belt link 20B and an adjacent barrier link 90A. The barrier link 90A is connected to the adjacent belt link 20B.

The fastening tab 32A of belt link 20A passes sideways through the trailing aperture 29B of the preceding belt link 20B, then through the aperture 98A of barrier 90A. After passing through the aperture in belt link 20B, the belt fastening tab 32A is twisted to bear against the top surface 92A of barrier link 90A.

The barrier links 90 attach to the belt links 20 in a similar manner. The connector tab 95A of barrier link 90A passes sideways through the leading aperture 28B of belt link 20B. After passing through the aperture in belt link 20B, the barrier connector tab 95A is twisted to bear against the top surface 38B of belt link 20B.

When connected in this manner, the barrier connector tabs 95 extend beyond the top surface 11 of the belt 15, so that the hot material 14 rests on the connector tabs 95 instead of the belt 15, as illustrated in FIG. 16. Although twice as many barrier links 90 are used in this embodiment as in the preferred embodiment, only half as many belt links 20 are used.

Figure 10:
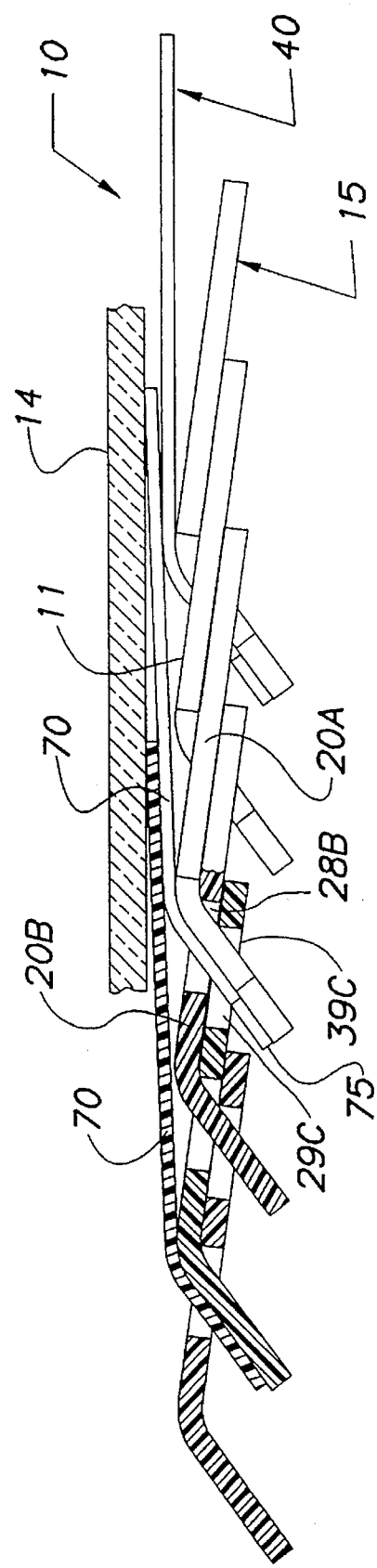
FIG. 10 is a fragmentary side view partially in section, of a third embodiment similar to that shown in FIG. 6, in which the heat protection barrier is comprised of flat barrier spacers.

The separate embodiment shown in FIG. 10 illustrates a section of the assembly 10 in which the heat protection barrier 40 comprises a series of flexible flat spacers 70 instead of interlocking barrier links. In this embodiment, the belt links 20 are connected to form the belt 15 in the same way as those in the preferred embodiment.

The flat barrier spacers 70 are similar to the barrier links 41, but the flat barrier spacers 70 do not have an aperture. Because the barrier spacers 70 do not have an aperture, they interlock with belt 15 but they do not interlock with other barrier spacers. Instead, the flat barrier spacers 70 extend from the belt, and are deflected into overlapping relation when the weight of the hot workpiece 14 is placed upon them.

The flat barriers spacers 70 attach to the belt 15 by passing the connector tab 75 of the flat barrier spacer 70 sideways through the apertures of two preceding belt links 20B and 20C. It first passes through the leading aperture 28B of the adjacent preceding belt link 20B, then through the trailing aperture 29C of the next preceding belt link 20C. After passing through the trailing aperture 29C, the spacer connector tab 75 is twisted to bear against the bottom surface 39C of belt link 20C.

As can be seen in FIG. 10 not every belt link 20 has a flat barrier spacer 70 associated with it. Instead, the flat barrier spacers 70 are sufficiently long so when the weight of the hot workpiece 14 is placed on the assembly, each barrier spacer overlaps its trailing barrier spacer. In this way, the entire top surface 11 of the belt is protected by a barrier spacer, even though a barrier spacer is only associated with alternating belt links 20.

The separate embodiment shown in FIG. 11 illustrates a section of the assembly 10 in which the heat protection barrier 40 comprises a series of cylindrical spacers 100 instead of interlocking barrier links. In this embodiment, the belt links 20 are connected to form the belt 15 in the same way as those in the preferred embodiment.

As shown in FIGS. 12 and 13, the cylindrical barrier spacer 100 comprises three cylindrically shaped portions: a body 101, a constricted neck 104, and a connector tab 106. The spacer neck 104 integrally connects with the spacer body 101, then extends longitudinally and integrally connects with the spacer connector tab 106.

To ensure a proper connection with the belt links 20, the diameter of the spacer body 101 and the spacer connector tab 106 are greater than the width 27 of the belt link apertures 28 and 29, while the diameter of the spacer neck 104 is smaller than the belt link aperture width 27. (See FIGS. 2 and 3 for an illustration of the belt links 20).

FIG. 11 illustrates the connection between a cylindrical barrier spacer 100 and two belt links 20A and 20B. To connect the cylindrical barrier spacers to the belt links, the spacer connector tab 106 passes through the leading aperture 28A of belt link 20A, then through the trailing aperture 29B of belt link 20B. Once passing through the apertures 28A and 29B, the connector tab 106 bears against the bottom surface 39B of belt link 20B.

In this instance, the cylindrical barrier spacers 100 are comprised of a high temperature thermoset engineering plastic, preferably, Vespel. Preferably, the material from which the belt links 20 are made is sufficiently resiliently deformable so that apertures 28 and 29 resiliently expand to allow the spacer tab 106 to pass through the apertures and interlock with the bottom surface 39B.

The cylindrical barriers spacers 100 connect to belt 15 so that each belt link 20 has a barrier spacer associated with it. When connected in this manner, the hot material 14 rests on the ends of the cylindrical barrier spacers instead of the belt 15.

Figure 14:
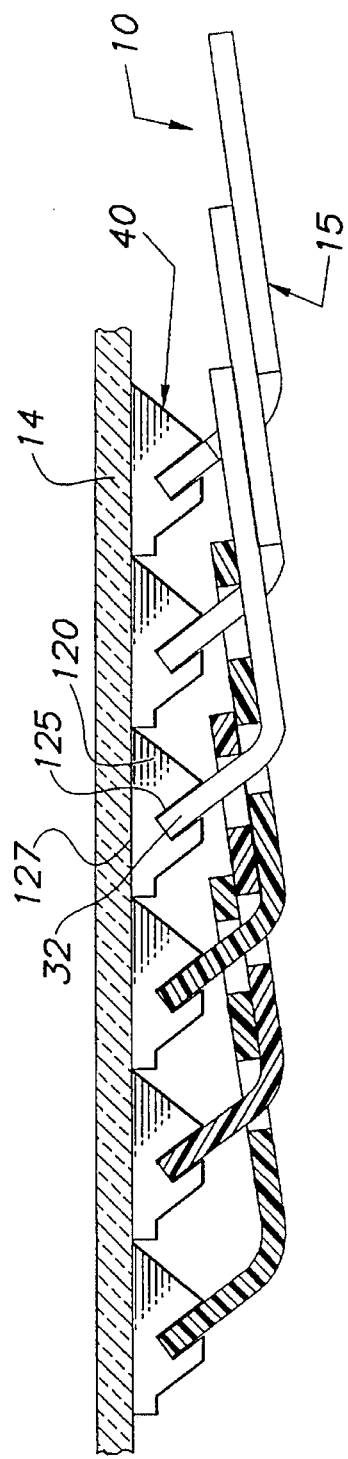
FIG. 14 is a fragmentary side view partially in section, of a still further embodiment of a high temperature interlocking-link conveyor assembly having a heat protection barrier comprising a number of polyhedral barrier spacers.

The separate embodiment shown in FIG. 14 illustrates a section of the assembly 10 in which the heat protection barrier 40 comprises a series of polyhedral spacers 120 instead of interlocking barrier links. In this embodiment, the belt links 20 are connected to form the belt 15 in the same way as those in the preferred embodiment.

Figure 15:
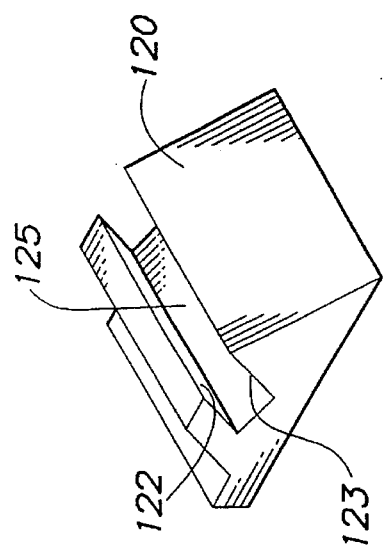
FIG. 15 is an isometric view of an individual polyhedral barrier spacer as shown in FIG. 14.

As illustrated in FIGS. 14 and 15, polyhedral barriers spacers 120 are polyhedral shaped, having a planar top surface 127 and a socket 125. The socket 125 extends transversely in the shape of a rectangular channel, having sides 122 and 123. The width of the socket 125 between the sides 122 to 123 corresponds to the thickness of the belt link fastening tab 32.

The polyhedral barriers spacers 120 connect to the belt 15 by inserting the belt link fastening tab 32 into the spacer socket 125. When connected in this manner, the hot workpiece 14 rests on the top surface 127 of the polyhedral barrier spacers, instead of the belt 15, as illustrated in FIG. 15.

In this instance, the polyhedral barrier spacers 120 are comprised of a high temperature thermoset engineering plastic, preferably, Vespel.

While the preferred embodiments of the invention have been described above and alternative embodiments have also been described, the scope of protection to which the invention is believed entitled is defined by the claims and by equivalents thereto which perform substantially the same function in substantially the same way to achieve substantially the same result as set forth in the claims.

We claim:

1. A high temperature conveyor assembly for transporting hot materials on the side of the assembly comprising:

an interlocking link belt comprising a series of belt links arranged in superimposed successive overlapping relation, said belt having a thickness between its top and bottom sides corresponding to a thickness of at least two belt links, each of said belt links having:
a body portion with a lateral width, a longitudinal length, at least one aperture, and an integral fastener at a leading end of said body portion and longitudinally-aligned with said aperture, said fastener comprising:
a laterally constricted fastener neck portion; and
a fastening tab connected to said body portion through said neck portion;
said belt links of said series being secured together in overlapping relation to form a belt by the neck of said fastener extending from one of said sides of the belt through said aperture in a preceding belt link, said fastening tab engaging the other of said sides of said belt at the preceding belt link to secure the belt links together; and
a heat protection barrier connected to said belt links, positioned on the top side of the belt which confronts the hot material transported by the assembly so as to provide a barrier against the hot material contacting the top side of the belt.

2. An assembly according to claim 1 wherein said heat protection barrier comprises a series of barrier members each comprising a barrier body portion positioned on the top side of the belt and an integral connector comprising:
a laterally constricted connector neck portion; and
a connecting tab connected to said barrier body portion through said connector neck portion; said barrier members being connected to said belt links by said connector neck extending through an aperture in at least one of said belt links, whereby said connecting tab is engaged on the other side of said belt.

3. An assembly according to claim 2 wherein each of said barrier members has at least one barrier aperture.

4. An assembly according to claim 3 wherein selected belt links have a barrier member associated with each of them, said barrier member being connected to said belt links by said barrier connector neck extending through a barrier aperture in the barrier member associated with the preceding selected belt link and a body aperture in at least one of said belt links.

5. An assembly according to claim 4 wherein said barrier member aperture is longitudinally-aligned with said connector.

6. An assembly according to claim 5 wherein said barrier member body has a lateral width at least as wide as the width of said belt links.

7. An assembly according to claim 3 wherein said barrier member has both a leading aperture and a trailing aperture longitudinally-aligned with said connector, said barrier member being connected to said series of belt links by said belt link fastener extending through said barrier leading aperture, and said barrier connector extending through both said barrier trailing aperture and said aperture in at least one belt link body portion.

8. An assembly according to claim 1 wherein each of said belt links of the belt has at least two apertures, one of said two apertures being longitudinally spaced from the other of said apertures, said one aperture being a leading aperture and said other aperture being a trailing aperture, said plurality of belt links being secured together in overlapping relation to form a belt by said link fasteners extending from one side of the belt through a leading aperture in the preceding belt link and a trailing aperture in a next preceding belt link, and said fastening tab engaging said next succeeding belt link on the other side of the belt.

9. An assembly according to claim 3 wherein each of said belt links of the belt has at least two apertures, one of said two apertures being longitudinally spaced from the other of said apertures, said one aperture being a leading aperture and said other aperture being a trailing aperture, said barrier members being connected to said series of belt links by said belt link fasteners extending through an aperture in an adjacent belt link and an aperture in an adjacent barrier member, and said barrier member connectors extending through an aperture in the preceding belt link.

10. An assembly according to claim 1 wherein said heat protection barrier comprises a series of barrier members having a portion positioned to support the hot material transported by said belt, said barrier member portion comprising a heat resistant polymer.

11. An assembly according to claim 10 wherein said heat resistant polymer is PTFE.

12. An assembly according to claim 1 wherein said heat protection barrier comprises a series of barrier members having a portion positioned to support the hot material transported by said belt, said barrier members having a top surface to which a heat resistant material is attached.

13. An assembly according to claim 1 wherein said fastening tab of each belt link engages the top side of the belt, and said heat protection barrier comprises a series of barrier members, each member having a socket engaging one of said fastening tabs to secure said barrier members to said link fastening tabs.

14. A high temperature conveyor assembly for transporting hot materials on a top side of the assembly comprising:
an interlocking-link belt comprising a series of belt links arranged in superimposed successive overlapping relation, said belt having a thickness between its top and bottom sides corresponding to a thickness of at least two belt links, each of said belt links having:
a body portion having a lateral width, a longitudinal length, an upper and lower surface, a leading aperture, a trailing aperture longitudinally spaced from said leading aperture and an integral fastener at a leading end of said body, longitudinally-aligned with said leading aperture, said fastener comprising:
a laterally constricted fastener neck portion; and
a fastening tab connected to said body portion through said neck portion;
a heat protection barrier connected to said belt links positioned on the top side of the assembly which confronts the hot material transported by the assembly so as to provide a barrier against hot material contacting the top side of the belt, said barrier comprising a series of barrier members comprising:
a barrier member body portion having a lateral width at least as wide as a width of said belt links, and having a barrier aperture, said barrier member body comprising a layer of a heat resistant polymer positioned on the top side of the belt; and
an integral connector longitudinally-aligned with said barrier aperture, comprising:
a laterally constricted connector neck portion; and
a connecting tab connected to said barrier body portion through said connector neck portion;
said plurality of belt links being secured together in overlapping relation to form a belt by said fasteners extending from one side of the belt through a leading aperture in a preceding belt link and a trailing aperture in a next preceding belt link, and said fastening tab engaging said next preceding belt link on the other side of the belt;

wherein selected belt links have a barrier member associated with them, said heat protection barrier being connected to said selected belt links by said barrier connector neck extending through a barrier aperture in the barrier member associated with the preceding selected belt link and an aperture in at least one belt link body portion, whereby said connecting tab is engaged on the other side of said belt links.

15. An assembly according to claim 14 wherein said barrier member has both a leading aperture and a trailing aperture longitudinally-aligned with said connecting means, said barrier members being connected to said series of belt links by said belt link fastener extending through said barrier leading aperture, and said barrier connector extending through both said barrier trailing aperture and said aperture in at least one belt link body portion.

* * * * *

UNITED STATES PATENT AND TRADEMARK OFFICE
CERTIFICATE OF CORRECTION

PATENT NO. : 5,564,558

DATED : October 15, 1996

INVENTOR : John Hampton

It is certified that errors appear in the above-identified patent and that said Letters Patent is hereby corrected as shown below:

Column 3, at 47, "beck" should be --neck--;

Column 8, at 64, "the" (first occurrence) should be --a top--.

Signed and Sealed this

Thirteenth Day of May, 1997

*Attest:*

BRUCE LEHMAN

*Attesting Officer*     *Commissioner of Patents and Trademarks*